(12) United States Patent
Weder et al.

(10) Patent No.: US 6,258,447 B1
(45) Date of Patent: Jul. 10, 2001

(54) DECORATIVE SHREDDED MATERIAL

(75) Inventors: Donald E. Weder; Sonny K. Burnside, both of Highland, IL (US)

(73) Assignee: Southpac Trust Int'l, Inc.

( * ) Notice: Subject to any disclaimer, the term of this patent is extended or adjusted under 35 U.S.C. 154(b) by 0 days.

(21) Appl. No.: 09/040,940

(22) Filed: Mar. 18, 1998

(51) Int. Cl.[7] .................................................. B32B 27/14
(52) U.S. Cl. ........................ 428/195; 428/43; 428/192; 428/196; 428/202; 428/207; 428/211; 206/271; 206/423; 206/484; 47/72
(58) Field of Search .......................... 428/43, 192, 207, 428/211, 195, 196, 202; 206/423, 484, 271

(56) References Cited

U.S. PATENT DOCUMENTS

| | | | |
|---|---|---|---|
| 2,016,334 | 10/1935 | McComb | 41/15 |
| 2,244,845 | 6/1941 | Matthews | 154/4 |
| 2,336,100 | 12/1943 | Jacque | 18/54 |
| 2,728,944 | 1/1956 | Crooks | 18/15 |
| 2,733,122 | 1/1956 | Herele et al. | 18/54 |
| 3,164,947 | 1/1965 | Gaston | 57/140 |
| 3,277,519 | 10/1966 | Jones | 18/1 |
| 3,336,174 | 8/1967 | Dyer et al. | 156/167 |
| 3,459,845 | 8/1969 | Hebeler | 264/168 |
| 3,558,580 | 1/1971 | Orser | 260/88.2 |
| 3,611,699 | 10/1971 | Wininger et al. | 57/140 |
| 3,650,877 | 3/1972 | Johnson | 161/47 |
| 3,653,955 | 4/1972 | Habib | 117/139.5 R |
| 3,673,056 | 6/1972 | Nadler | 161/62 |
| 3,677,691 | 7/1972 | Koch . | |
| 3,717,689 | 2/1973 | Tanaka et al. | 260/898 |
| 3,803,284 | 4/1974 | Burghardt et al. | 264/130 |
| 3,869,533 | 3/1975 | Janocha et al. | 264/146 |
| 3,898,117 | 8/1975 | Taylor | 156/163 |
| 4,035,531 | 7/1977 | Lark | 427/390 |
| 4,102,848 | 7/1978 | Koch et al. | 260/31.6 |
| 4,199,627 | * 4/1980 | Weder et al. | 428/7 |
| 4,230,752 | 10/1980 | Benedyk | 428/17 |
| 4,238,384 | 12/1980 | Blumberg et al. | 260/37 |
| 4,292,266 | 9/1981 | Weder et al. | 264/140 |
| 4,401,700 | 8/1983 | Weder et al. | 428/17 |
| 4,496,614 | 1/1985 | Weder et al. | 428/7 |
| 4,549,908 | 10/1985 | Weder et al. | 106/266 |
| 4,735,669 | 4/1988 | Guida et al. | 156/229 |
| 4,786,560 | 11/1988 | Crocker | 422/500 |
| 5,085,003 | 2/1992 | Garcia | 47/72 |
| 5,238,707 | 8/1993 | Weder et al. | 427/212 |
| 5,340,608 | 8/1994 | Weder et al. | 427/212 |
| 5,656,233 | 8/1997 | Weder et al. | 264/553 |
| 5,678,388 | 10/1997 | Weder | 53/435 |
| 5,899,144 | * 5/1999 | Parks | 101/129 |
| 5,906,280 | * 5/1999 | Weder | 206/584 |

* cited by examiner

*Primary Examiner*—Deborah Jones
*Assistant Examiner*—Abraham Bahta
(74) *Attorney, Agent, or Firm*—Dunlap, Codding & Rogers, PC

(57) ABSTRACT

A decorative shredded material having a complete pattern contained on each strip or piece of the decorative shredded material. Methods for making decorative shredded material.

4 Claims, 3 Drawing Sheets

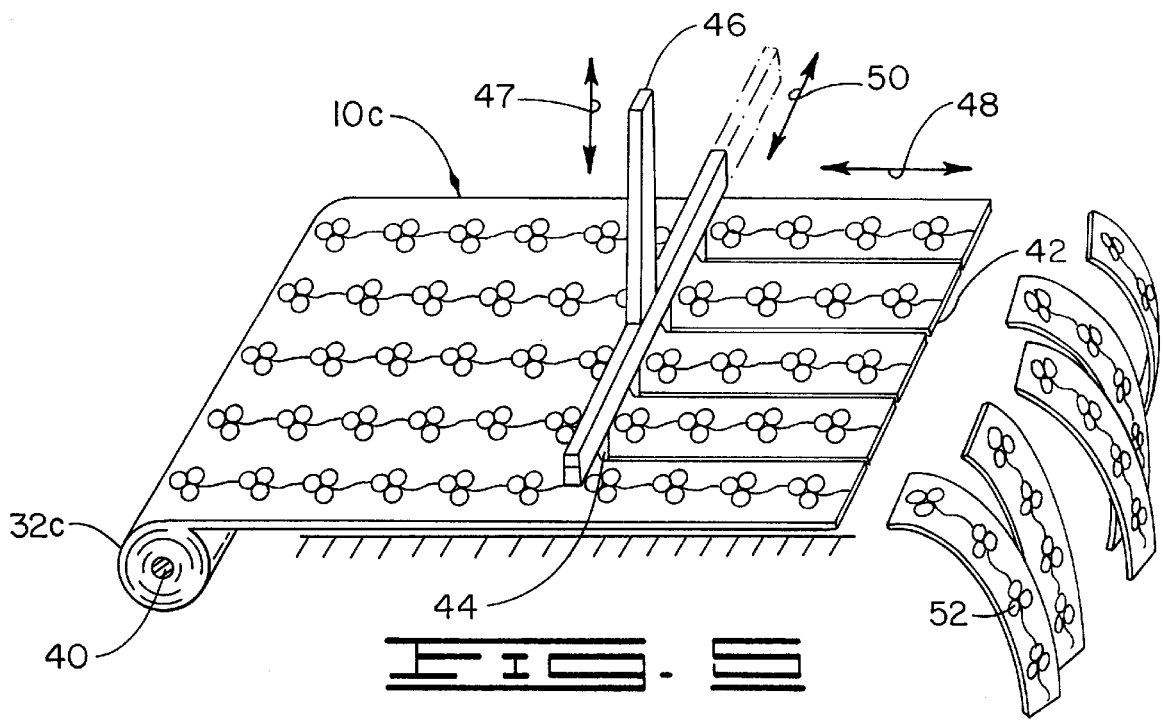
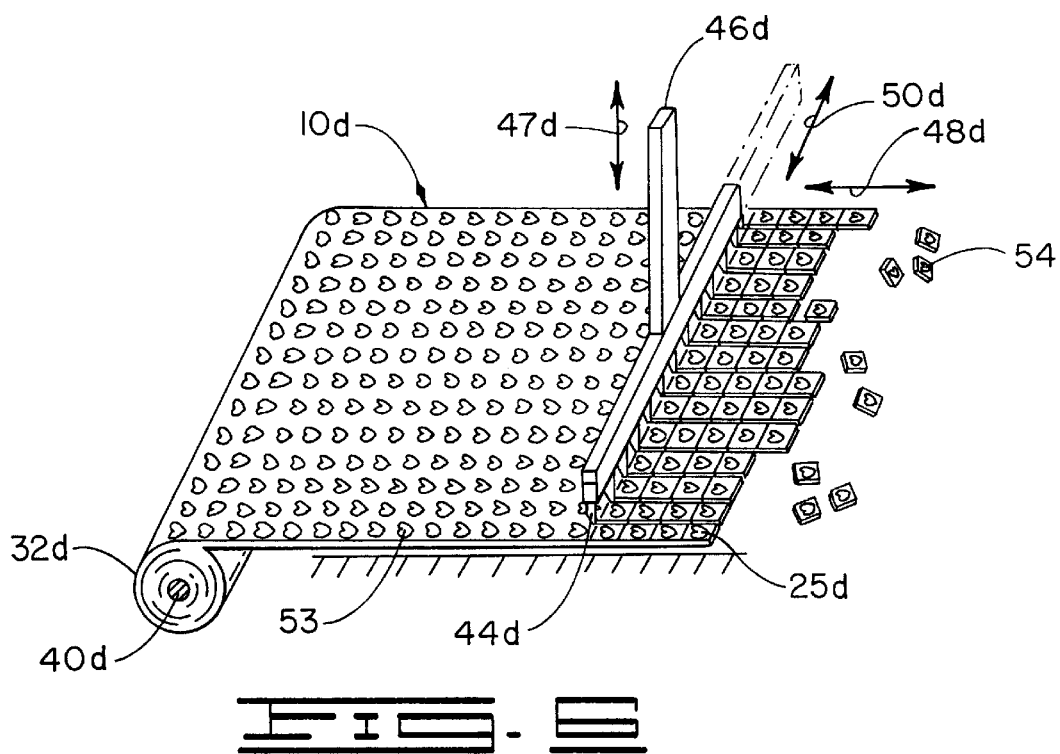

DECORATIVE SHREDDED MATERIAL

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates to decorative material and, particularly, decorative shredded material and the methods of creating such a material.

2. Description of Related Art Including Information Disclosed Under 37 CFR § 1.97 and 37 CFR § 1.98

Sheets of material have been cut to form shredded material, first for packing purposes, later for decorative purposes. One decorative shredded material, a decorative grass formed from shredded plastic sheets, is disclosed in U.S. Pat. No. 4,199,627. A process for forming plastic sheets into a decorative grass is shown in U.S. Pat. No. 4,292,266. Compositions for forming a decorative grass, discussing pigments used to color such a grass, are disclosed in U.S. Pat. No. 4,401,700, U.S. Pat. No. 4,496,614 and U.S. Pat. No. 4,549,908.

The prior art discloses using sheets of material to shred into shredded material, and various ways to provide an overall color to each sheet of material before it is shredded. The prior art does not disclose a sheet of material having specific patterns thereon provided in specific locations prior to shredding or flaking. The prior art does not reveal shredding such a pre-patterned sheet of material having specific patterns thereon in a manner which permits the retention of the substantially complete pattern on each strip or piece which is shredded.

There is a need in the art for a sheet of material having specific patterns aligned in such a manner that the sheet may be shredded and each shredded piece or strip of material will retain the substantially complete pattern, thereby providing a new decorative shredded material.

BRIEF SUMMARY OF THE INVENTION

The decorative shredded material comprises a sheet of material having an upper surface, a lower surface and an outer periphery. The sheet of material has a plurality of patterns on at least one surface, and each pattern of the plurality of patterns is oriented along more than one axis. When the sheet of material is shredded into a plurality of decorative strips, at least one complete pattern of the plurality of patterns is contained on each of the plurality of decorative strips.

Alternatively, the decorative shredded material comprises a sheet of material having an upper surface, a lower surface and an outer periphery. The sheet of material has a plurality of patterns on at least one surface, and each pattern of the plurality of patterns is oriented along more than one axis. When the sheet of material is shredded into a plurality of decorative elements, at least one complete pattern of the plurality of patterns is contained on each of the plurality of decorative elements.

In a method for providing a decorative shredded material, the method comprises providing a sheet of material having an upper surface, a lower surface and an outer periphery. The sheet of material has a plurality of patterns on at least one surface, each pattern of the plurality of patterns oriented along more than one axis. The method also comprises cutting the sheet of material into a plurality of decorative strips, wherein at least one complete pattern of the plurality of patterns is contained on each of the plurality of decorative strips.

In an alternative method for providing a decorative shredded material, the method comprises providing a sheet of material having an upper surface, a lower surface and an outer periphery, the sheet of material having a plurality of patterns on at least one surface, each pattern of the plurality of patterns oriented along more than one axis. The method also comprises cutting the sheet of material into a plurality of decorative elements, wherein at least one complete pattern of the plurality of patterns is contained on each of the plurality of decorative elements.

BRIEF DESCRIPTION OF THE SEVERAL VIEWS OF THE DRAWINGS

FIG. 5 is a perspective view of a roll of sheets of material constructed in accordance with the present invention, showing a plurality of knife edges being actuated by an actuator into a first shredding direction to cut at least a portion of the roll of sheets of material into elongated decorative strips.

FIG. 6 is a perspective view of a roll of sheets of material constructed in accordance with the present invention, showing a plurality of knife edges being actuated by an actuator into a second cutting direction to cut the elongated decorative strips into smaller decorative elements.

DETAILED DESCRIPTION OF THE INVENTION

Figure 1:
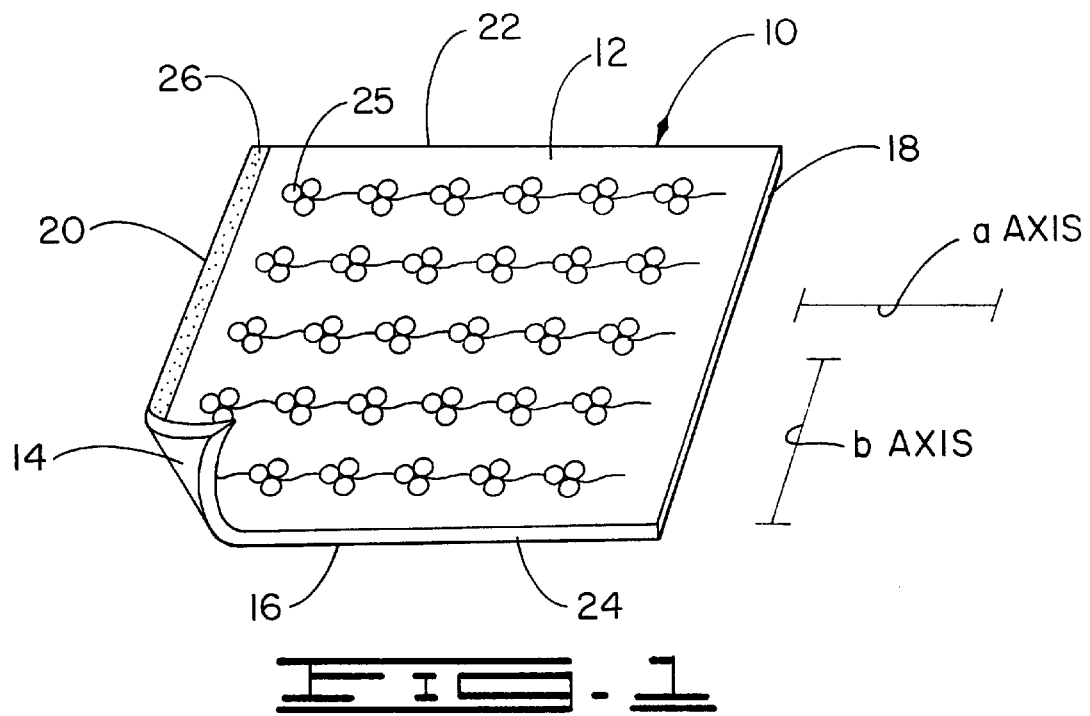
FIG. 1 is a perspective view of the sheet of material constructed in accordance with the present invention, showing a plurality of patterns disposed on the upper surface, each of the plurality of patterns oriented on the sheet of material both horizontally and vertically. A corner is lifted showing the lower surface for illustration purposes only.
Figure 2:
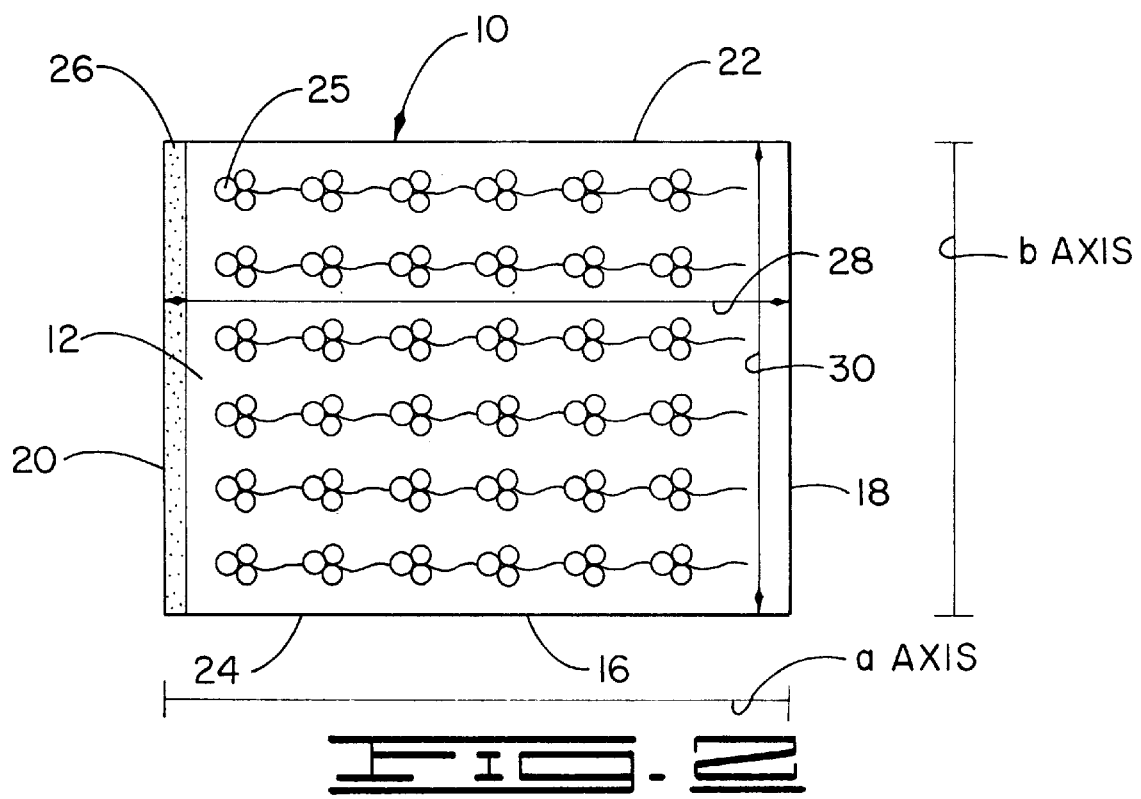
FIG. 2 is a top plan view of the upper surface of the first sheet of material constructed in accordance with the present invention.

The Embodiments of FIGS. 1–2

Decorative shredded material is frequently used as confetti, decorative grasses, tinsel, and the like (such decorative shredded material also being called "filamentary portions"), and is used to surround other items in various types of gift packages.

These decorative shredded materials are often provided as a plurality of strips of a solid color. Alternatively, these decorative shredded materials are often provided as a plurality of strips of multi-color material, or material having a pattern thereon. If a pattern is contained on the unshredded material, the material, when shredded, has components of the pattern, but not a total pattern contained within each strip of material.

The present invention contemplates a decorative shredded material formed from a material having a printed pattern thereon, the pattern arranged so that, when the material is shredded into a plurality of discreet, separate strips, the complete pattern is contained upon each strip of the decorative shredded material. In this manner, interesting patterns are formed and contained within each strip, as opposed to irregular, unclear and cut-apart patterns which would occur when a patterned sheet of material was shredded into strips.

An objective of this invention is to provide a decorative shredded material formed from a sheet of material which, when shredded into specific strips, forms decorative strips in which each strip contains a specific, complete pattern thereon.

A goal of this invention is to also provide a decorative shredded material formed from a sheet of material which, when shredded into specific small pieces, forms decorative pieces ("decorative elements") in which each decorative piece contains a specific, complete pattern.

Turning now to the Figures, shown in FIGS. 1–2 and designated therein by the general reference numeral 10 is sheet of material. The sheet of material 10 has an upper surface 12, a lower surface 14, and an outer periphery 16. As shown in FIGS. 1 and 2, the outer periphery 16 further comprises a first side 18, a second side 20, a third side 22 and a fourth side 24.

The sheet of material has printed and/or disposed on at least one surface a pattern 25. "Pattern" as used herein, means any geometric shape, non-geometric shape, asymmetric shape, and/or combination of shapes, which is printed or disposed via any manner known in the art on the sheet of material 10. The pattern 25 is usually oriented along two axes, such as, but not by way of limitation, along the length of the sheet of material 10 and along the width of the sheet of material 10 such that, when the sheet of material 10 is shredded into a decorative shredded material, the entire pattern is contained on each strip or each piece of the shredded sheet of material 10. These two axes are designated on FIGS. 1–2 as the "a axis" and the "b axis" which, in this example, but not by way of limitation, are formed at a ninety degree (90%) angle with respect to each other, and apply to all Figures shown herein. It will be appreciated, however, that in other embodiments there may be an additional axis and/or axes, each having different positions relative to each other.

Guidelines (not shown) may also be included on the sheet of material 10. Guidelines may be used to define the area on the sheet of material to be cut, so that the sheet of material may be shredded into separate strips or pieces without cutting substantially into any portion of a pattern 25 printed on each strip or piece of the sheet of material 10.

The pattern 25 is oriented, as noted above, along two or more axes so that the pattern 25 is contained within the specified, pre-determined area on each portion of the sheet of material 10. In this manner, the complete pattern 25 is retained on each strip and each piece of decorative shredded material. In addition, no substantial additional portion of any pattern 25 on the sheet of material is included with the primary pattern 25. In this manner, each strip or piece of the decorative shredded material has only the predetermined pattern 25 thereon.

A bonding material 26 may, optionally, be disposed on the sheet of material 10, on either the upper surface 12, the lower surface 14, or both surfaces. Alternatively, however, the sheet of material 10 may be free of a bonding material 26. As illustrated in FIG. 1, the bonding material 26, if present, is often disposed on the upper surface 12 of the sheet of material 10. The bonding material 26 may also be disposed in a strip of bonding material 26, although the bonding material 26 also could be applied to a surface of the sheet of material 10 in the form of spaced apart spots or the bonding material 26 may be disposed on one or more surfaces of the sheet of material 10 in any geometric shape, non-geometric and/or asymmetric shape, or any combination thereof, including any pattern or plurality of patterns. Further, the bonding material 26 may form at least a part, or, alternatively, all of the pattern on each strip of material. In this instance, the bonding material 26 may comprise one or more colors; the bonding material 26 may comprise one or more patterns as well, as described above.

Turning now to the characteristics of the sheet of material 10 used to form the decorative shredded material, the sheet of material 10 has a thickness in a range from about 0.1 mils to about 20 mils. Often, the sheet of material 10 has a thickness in a range from about 0.2 mils to about 10 mils. The sheet of material also often has a thickness in a range from about 0.2 mils to about 3.5 mils. In some embodiments, the sheet of material has a thickness in a range from about 0.5 mils to about 2.5 mils. In other embodiments, the sheet of material has a thickness in a range from about 0.4 mils to about 1.0 mils. The sheet of material 10 is constructed of a material which is at least somewhat flexible.

The sheet of material 10 may comprise any shape or combination of shapes, and a rectangular shape is shown in FIG. 1 only by way of example. The sheet of material 10 for example may be square, rectangular, circular or any other geometric, non-geometric, asymmetric or fanciful shape, such as heart shaped, for example only. The sheet of material 10 may be constructed of a single layer of material or a plurality of layers of the same or different types of materials. The layers of material comprising the sheet of material 10 may be laminated together or connected together by any method known in the art.

In one embodiment, the sheet of material 10 is a thin, flexible material constructed from a paper. Alternatively, a plastic film may be utilized, alone, or in combination with other sheets of material described herein. Such a plastic film (Hercules B523 oriented polypropylene packaging film (clear)), is available from Hercules Incorporated, Hercules Plaza, Wilmington, Del. 19894. Such sheets of material may be laminated together or may be connected together by any method known in the art, or may remain partially or completely unconnected.

The sheet of material 10 shown in FIG. 1 is constructed from any suitable material that is capable of being both printed on and being shredded. The sheet of material 10 must be capable of being shredded without any substantial tearing or degradation by either process (printing and/or shredding). Further, the sheet of material 10 must be capable of being shredded into decorative shredded material, such as, but not by way of limitation, confetti, decorative grass, tinsel, glitter, flakes, and the like.

As described above, the sheet of material 10 often comprises paper (the term "paper" as used herein means treated or untreated paper, corrugated paper or cardboard or any other form of paper material). The sheet of material 10 may comprise cellophane, foil, plastic film, metallized film, fabric (woven or nonwoven or synthetic or natural), fiber, burlap, or any combination thereof.

The term "plastic film" as used herein means a thermoplastic resinous material, such as, but not by way of limitation, a man-made polymer such as, but not by way of limitation, a polypropylene. The term "plastic film" as used herein also means a naturally occurring polymer such as cellophane. A plastic film, as contemplated and described in detail herein, is relatively strong and not as subject to tearing (substantially non-tearable), as might be the case with paper or foil.

The sheet of material 10 has a length 28 extending between the first and second sides 18 and 20 of the sheet of material 10. The sheet of material 10 also has a width 30 extending between the third and fourth sides 22 and 24 of the sheet of material 10.

The sheet of material 10 may be constructed of a single layer of material or a plurality of layers of the same or different types of materials. One or more sheets of material are laminated or bonded together, completely or partially, by any method known in the art, so long as the end result is a sheet of material 10 having the ability to both sustain a printed pattern thereon and to be shredded into decorative shredded strips of material. It will therefore be appreciated that multiple sheets of material 10 may be used. Moreover, when multiple sheets of material 10 are used, the sheets of material 10 need not be uniform in size or shape. That is, one sheet may extend beyond at least a portion of the outer periphery of another sheet of material.

As noted earlier, a bonding material 26 may be disposed on the sheet of material 10, in any pattern or shape. One method for disposing a bonding material, in this case an adhesive, on a sheet of material is described in U.S. Pat. No. 5,111,637 entitled "Method For Wrapping A Floral Grouping" issued to Weder et al., on May 12, 1992 and which is hereby incorporated herein by reference. Another method for disposing a bonding material in order to laminate two sheets of material is described in U.S. Pat. No. 4,297,811 entitled "Laminated Printed Foil Flower Pot Wrap With Multicolor Appearance", issued to Weder on Nov. 3, 1981, which is also hereby incorporated herein by reference.

The term "bonding material" when used herein means an adhesive, possibly a pressure sensitive adhesive, or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" when used herein also means a lacquer, which may be applied to the sheet of material and, in this instance, heat, sound waves, or vibrations, also must be applied to effect the sealing of the lacquer.

The sheet of material 10 may consist of designs or decorative patterns which are printed, etched, and/or embossed thereon using inks or other printing materials. An example of an ink which may be applied to either surface of the sheet of material 10 is described in U.S. Pat. No. 5,147,706 entitled "Water Based Ink On Foil And/Or Synthetic Organic Polymer" issued to Kingman on Sep. 15, 1992 and which is hereby incorporated herein by reference. In addition, the sheet of material 10 may have various colorings, coatings, embossings, flockings and/or metallic finishes, or other decorative surface ornamentation applied separately or simultaneously. The sheet of material 10 may be characterized totally or partially, but not by way of limitation, by pearlescent, translucent, transparent, iridescent, neon, holographic, or the like, qualities. Each of the above-named characteristics may occur alone or in combination with other characteristics described herein, and may be applied to the upper and/or lower surface of the sheet of material 10. Moreover, each surface of the sheet of material 10 may vary in the combination of such characteristics. The sheet of material 10 may also be partially or completely opaque, translucent, clear and/or tinted transparent.

Figure 3:
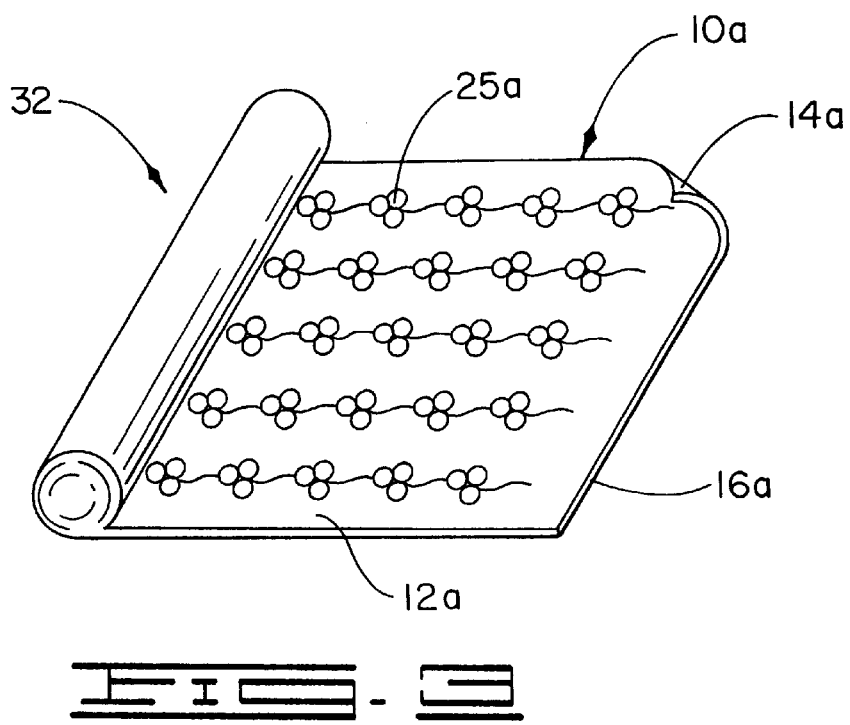
FIG. 3 is a perspective view of a plurality of sheets of material constructed in accordance with the present invention forming a continuous roll of sheets, the roll partially unrolled to reveal at least one sheet of material.

Embodiment of FIGS. 3

Referring now to FIG. 3, a plurality of individual sheets of material 10a are connected linearly together to form a roll 32. The plurality of sheets of material 10a in the roll 32 may be connected together by perforations (not shown). Such a roll 32 permits one sheet of material 10a to be withdrawn from the roll 32, then severed or disconnected from the roll 32. As shown in FIG. 3, the roll 32 is often formed as a continuous roll 32 of sheets of material 10a, wherein a plurality of sheets of material 10a may be removed from the roll 32 by unrolling a portion of the roll 32, and using a separate cutting element (not shown) to sever the unrolled portion of the roll 32 of material (not shown). The roll 32 may also be contained within any type of dispenser (not shown). When the roll 32 is disposed in a dispenser, a portion of the material is again unrolled, and a cutting edge (not shown) contained within the dispenser, or a separate cutting element (not shown), severs the unrolled portion of the material.

Any number of sheets of material 10a may form a roll 32 as long as it is possible to unroll the material into at least one sheet of material 10a and shred the sheet of material 10a into decorative shredded material, as described below.

Figure 4:
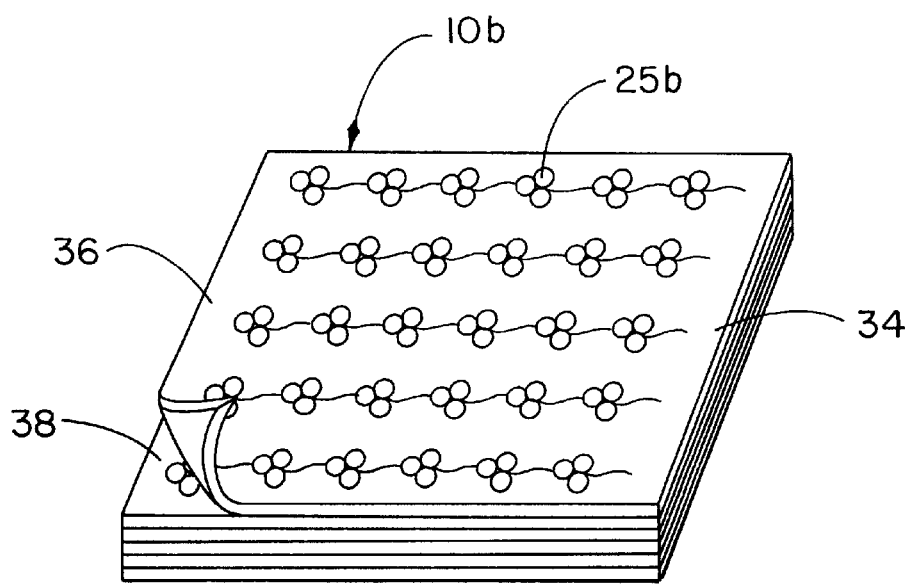
FIG. 4 is a perspective view of a pad having a plurality of sheets of material constructed in accordance with the present invention, showing an edge of the top sheet lifted, exposing the next sheet for illustration purposes only.

Embodiments of FIG. 4

Shown in FIG. 4 is a modified sheet of material 10b which is identical to the sheet of material 10 shown in FIGS. 1–2 and described in detail previously, except that the sheet of material 10b is formed into sheets of material 10b which are stacked and aligned, generally, but not by way of limitation, one on top of the other to form a pad 34 of sheets of material 10b.

The pad 34 comprises a top sheet 36 having a next sheet 38 disposed directly thereunder, with additional sheets of material 10b disposed under the next sheet 38, all sheets of material 10b collectively forming the pad 34 of sheets of material 10b (one edge of the top sheet 36 lifted for illustration purposes only). The sheets of material 10b are generally aligned, and may, optionally, but not by way of limitation, be connected together via a bonding material (not shown), such as, but not by way of limitation, a pressure sensitive adhesive.

Embodiments and Methods of FIG. 5

Shown in FIG. 5 is a modified roll 32c of sheets of material 10c. The roll 32c of sheets of material 10c is constructed exactly like the roll 32 of sheets of material 10a described before, except the roll 32c is supported on a generally mounted shaft 40. At least one sheet of material 10c is withdrawn from the roll 32c via a leading edge 42 until a predetermined length of the sheet of material 10c has been withdrawn from the roll 32c. In this position, a portion of the sheet of material 10c is disposed under a plurality of knife edges 44 (only one of the plurality of knife edges designated by the numeral 44). The plurality of knife edges 44 are connected to an actuator 46 adapted to move the plurality of knife edges 44 into an engagement position 47 with the sheet of material 10c. In the engagement position 47, the actuator 46 moves the plurality of knife edges 44 in a first shredding direction 48 to produce a plurality of elongated decorative strips 52 from the sheet of material 10c. The actuator 46 also moves the plurality of knife edges 44 in a second cutting direction 50, so that each of the elongated decorative strips 52 may be severed from the sheet of material 10c. When the predetermined length of the sheet of material 10c has been withdrawn from the roll 32c, the actuator 46 actuates to move the plurality of knife edges 44 in the first shredding direction 48 to a position wherein the knife edge 44 cuttingly and severingly engages the sheet of material 10c to shreddingly cut a plurality of elongated decorative strips 52 of the sheet of material 10c and to sever the plurality of elongated strips 52 from the sheet of material 10c.

It will be appreciated, as shown in FIGS. 1–2 and 5, that the pattern 25c on the sheet of material 10c is specifically printed, and the printing is spaced apart upon the sheet of material 10c and is adapted and formed to extend down each decorative strip 52. That is, the pattern 25c is oriented primarily upon at least, but not by way of limitation, one axis, and usually two or more axes, which permits the pattern 25c, in its entirety, to be contained on each decorative strip 52, with no overlap of an adjoining pattern 25c on each decorative strip 52, each decorative strip 52 containing only the pattern 25c provided on the sheet of material 10c for that decorative strip 52, and each strip containing the complete pattern 25c, without any loss of the pattern 25c. The pattern 25c conforms to the narrow decorative strip 52, so that each of the plurality of knife edges 44 cuts the sheet of material 10c in a location that does not contain the pattern 25c. In this manner, the pattern 25c remains intact and whole upon each decorative strip 52, as illustrated in FIG. 5.

Embodiments and Methods of FIG. 6

Shown in FIG. 6 is a modified roll 32d of sheets of material 10d. The roll 32d of sheets of material 10d is constructed exactly like the roll 32 and 32c of sheets of material 10a and 10c described previously, except that the sheets of material 10d have a pattern 25d comprising a plurality of hearts design printed thereon, the design being aligned along both the a axis and the b axis such that each of the plurality of hearts is capable of being contained on a small piece of the sheet of material 10d after the sheet of material 10d is severed into a plurality of small pieces. The sheet of material 10d is supported on a generally mounted shaft 40d. At least one sheet of material 10d is withdrawn from the roll 32d via a leading edge 42d (not shown) until a predetermined length of the sheet of material 10d has been withdrawn from the roll 32d. In this position, a portion of the sheet of material 10d is disposed under a plurality of knife edges 44d as described above. The plurality of knife edges 44d are connected to an actuator 46d adapted to move the plurality of knife edges 44d into an engagement position 47d with the sheet of material 10d. In the engagement position 47d, the actuator 46d moves the plurality of knife edges 44d in a first shredding direction 48d to produce a plurality of short strips 53 (only one of the plurality being referenced by the numeral "53") from the sheet of material 10d. The actuator 46d then turns the plurality of knife edges 44d into to a second cutting direction 50d wherein the plurality of knife edges 44d which first cut the plurality of short strips 53 via the first shredding direction 48d now cuttingly and severingly re-engages the plurality of short strips 53 to cut the plurality of short strips 53 into small pieces. In this second cutting direction 50d, as described, the plurality of short strips 53 are further severed into small pieces, for use as, but not by way of limitation, confetti, and the like, for example. These small pieces are collectively referred to herein as "decorative elements" and are designated by the numeral 54.

When the sheet of material 10d is shredded into a plurality of decorative elements 54, it will be appreciated that the pattern 25d formed on the sheet of material 10d, such as, by not by way of limitation, the plurality of hearts pattern 25d shown on the sheet of material 10d, is formed to accommodate such a formation of a plurality of decorative elements 54 via shredding and cutting. That is, the pattern 25d will be oriented on the sheet of material 10d on two or more axes such that none of the pattern 25d is lost in the cutting process, and that the entire pattern is substantially contained on each decorative element 54, as shown in FIG. 6. In addition, such an orientation of the pattern 25d permits only the one, intended pattern 25d on each decorative element 54.

It will be appreciated that, rather than a roll 32 of sheets of material 10, a pad (not shown) of sheets of material 10 also could be provided, and that the actuator 46 and the plurality of knifed edges 44 could be adapted such that the pad of sheets of material 10 could be cut thereby forming decorative strips 52 and/or decorative elements 54, as illustrated herein and described in detail.

It will also be appreciated that when either decorative strips 52 or decorative elements 54 are formed from a pad (not shown), the pattern 25 contained on the plurality of sheets of material 10 contained within the pad 34 will be maintained, as described previously, on either the decorative strips 52 or the decorative elements 54.

It will be understood that the mechanical process of forming such decorative strips 52 or decorative elements 54 is represented only schematically in the drawings. The actuator 46 may comprise a hydraulic or pneumatic cylinder or a motor and gear arrangement or any other form of arrangement suitable for moving the plurality of knife edges 44 in the first shredding direction 48 and/or the second cutting direction 50. After the knife edge 44 has cuttingly severed the desired portion of the sheet of material 10 from the roll 32 or a pad 34 (not shown), the actuator 46 is actuated to move the plurality of knife edges 44 in a storage direction (not shown) to a storage position (not shown). Alternatively, the leading edge 42 may be directed across a first plurality of knife edges 44 (not shown) set in the surface to form the decorative strips 52, wherein the actuator 46 actuates a second plurality of knife edges 44 (not shown) to cross-cut the elongated decorative strips 52 into decorative elements 54 (not shown). Apparatus and methods for making decorative shredded materials and the like is disclosed in U.S. Pat. No. 4,646,388, entitled, "Apparatus For Producing Weighed Charges Of Loosely Aggregated Filamentary Material", issued to Weder et al. on Mar. 3, 1987, which is hereby incorporated by reference herein. Another process for forming decorative shredded material into decorative grass is disclosed in U.S. Pat. No. 4,292,266, entitled, "Process For Making Decorative Grass", issued to Weder et al. on Sep. 29, 1981, which is hereby incorporated by reference herein. Yet another decorative grass is shown and described in U.S. Pat. No. 4,199,627, entitled, "Decorative Grass", issued to Weder et al. on Apr. 22, 1980, which is hereby incorporated by reference herein. Compositions used for forming decorative grass are disclosed in U.S. Pat. Nos. 4,401,700, 4,496,614 and 4,549,908, entitled, collectively, "Composition For Decorative Grass", issued to Weder et al. on Aug. 30, 1983, Jan. 29, 1985, and Oct. 29, 1985, respectively, all of which are hereby incorporated by reference herein.

Changes may be made in the construction and the operation of the various components, elements and assemblies described herein or in the steps or the sequence of steps of the methods described herein without departing from the spirit and scope of the invention as defined in the following claims.

What is claimed is:

1. A decorative shredded material, comprising:

a plurality of decorative strips, said strips formed from a sheet of material having an upper surface, a lower surface and an outer periphery, wherein a plurality of patterns oriented along more than one axis are provided on at least one surface of the sheet of material, each of the decorative strips containing at least one complete pattern; and a bonding material wherein the bonding material comprises at least a portion of the pattern.

2. The decorative shredded material of claim 1 wherein the sheet of material is constructed from a material selected from the group consisting of paper, cellophane, foil, polymer film, fabric, fiber, burlap, cloth, and any combination thereof.

3. A decorative shredded material, comprising:

a plurality of decorative elements, said elements formed from a sheet of material having an upper surface, a lower surface and an outer periphery, wherein a plurality of patterns oriented along more than one axis are provided on at least one surface of the sheet of material, each of the decorative elements containing at least one complete pattern; and a bonding material wherein the bonding material comprises at least a portion of the pattern.

4. The decorative shredded material of claim 3 wherein the sheet of material is constructed from a material selected from the group consisting of paper, cellophane, foil, polymer film, fabric, fiber, burlap, cloth, and any combination thereof.

* * * * *

UNITED STATES PATENT AND TRADEMARK OFFICE
CERTIFICATE OF CORRECTION

| | | |
|---|---|---|
| PATENT NO. | : 6,258,447 B1 | Page 1 of 1 |
| APPLICATION NO. | : 09/040940 | |
| DATED | : July 1, 2001 | |
| INVENTOR(S) | : Donald E. Weder et al. | |

It is certified that error appears in the above-identified patent and that said Letters Patent is hereby corrected as shown below:

Col. 3, Line 42: "%" symbol after number "90" should be --degree-- symbol.
        Line 43: after word "all" change word "Figures" to word --figures--.

Col. 7, Line 56: after number "44d" delete word "into".

Col. 8, Line 3: after word "as" change word "by" to word --but--.

Col. 9, Line 15: after word "paper" and before word "foil" delete word "cellophane".

Col. 10, Line 13: after word "paper" and before word "foil" delete word "cellophane".

Signed and Sealed this

Second Day of January, 2007

JON W. DUDAS
*Director of the United States Patent and Trademark Office*

UNITED STATES PATENT AND TRADEMARK OFFICE
CERTIFICATE OF CORRECTION

PATENT NO.       : 6,258,447 B1                                    Page 1 of 1
APPLICATION NO.  : 09/040940
DATED            : July 10, 2001
INVENTOR(S)      : Donald E. Weder et al.

It is certified that error appears in the above-identified patent and that said Letters Patent is hereby corrected as shown below:

Col. 3, Line 42: "%" symbol after number "90" should be --degree-- symbol.
Line 43: after word "all" change word "Figures" to word --figures--.

Col. 7, Line 56: after number "44d" delete word "into".

Col. 8, Line 3: after word "as" change word "by" to word --but--.

Col. 9, Line 15: after word "paper" and before word "foil" delete word "cellophane".

Col. 10, Line 13: after word "paper" and before word "foil" delete word "cellophane".

This certificate supersedes Certificate of Correction issued January 2, 2007.

Signed and Sealed this

Sixth Day of February, 2007

JON W. DUDAS
*Director of the United States Patent and Trademark Office*